United States Patent
Uematsu et al.

(10) Patent No.: US 6,936,996 B2
(45) Date of Patent: Aug. 30, 2005

(54) CONTROL APPARATUS FOR ELECTRICAL GENERATOR OF VEHICLE

(75) Inventors: Tadashi Uematsu, Kariya (JP); Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 104 days.

(21) Appl. No.: 10/614,201

(22) Filed: Jul. 8, 2003

(65) Prior Publication Data

US 2004/0008008 A1 Jan. 15, 2004

(30) Foreign Application Priority Data

Jul. 9, 2002 (JP) ..................................... 2002-199378

(51) Int. Cl.[7] .............................. H02J 7/14; H02J 7/24; H02K 11/00; H02H 7/06
(52) U.S. Cl. ......................................... 322/99; 322/28
(58) Field of Search ................................... 322/28, 99

(56) References Cited

U.S. PATENT DOCUMENTS

| | | | | |
|---|---|---|---|---|
| 2,896,149 A | * | 7/1959 | Lowry, Jr. et al. | 322/28 |
| 3,048,768 A | * | 8/1962 | Conger | 322/28 |
| 3,210,630 A | * | 10/1965 | Zelina | 318/52 |
| 3,622,858 A | * | 11/1971 | Mitchell | 320/123 |
| 3,646,356 A | * | 2/1972 | Hoffman | 307/87 |
| 4,362,982 A | * | 12/1982 | Akita et al. | 320/123 |
| 4,477,766 A | * | 10/1984 | Akita et al. | 322/28 |
| 4,511,807 A | * | 4/1985 | Somerville | 290/44 |
| 4,513,239 A | * | 4/1985 | Morishita et al. | 322/99 |
| 4,812,732 A | | 3/1989 | Iwatani | 322/99 |
| 4,825,330 A | * | 4/1989 | Walchle | 361/95 |
| 5,089,766 A | * | 2/1992 | Iwatani | 322/25 |
| 5,184,060 A | * | 2/1993 | Iwatani | 322/99 |
| 5,264,779 A | * | 11/1993 | Satoh et al. | 322/28 |
| 5,469,816 A | * | 11/1995 | Murakawa et al. | 123/2 |
| 5,514,989 A | * | 5/1996 | Sato et al. | 327/109 |
| 5,563,497 A | * | 10/1996 | Iwatani et al. | 322/99 |
| 5,717,421 A | * | 2/1998 | Katakura et al. | 345/101 |
| 5,747,972 A | * | 5/1998 | Baretich et al. | 323/223 |
| 5,754,154 A | * | 5/1998 | Katakura et al. | 345/97 |
| 6,140,915 A | * | 10/2000 | Iwatani | 340/438 |
| 6,229,288 B1 | * | 5/2001 | Baretich et al. | 323/223 |
| 6,366,062 B2 | * | 4/2002 | Baretich et al. | 323/223 |
| 6,472,854 B2 | * | 10/2002 | Ootani | 323/272 |
| 6,486,639 B1 | * | 11/2002 | Montret et al. | 322/29 |
| 6,534,959 B1 | * | 3/2003 | Anderson et al. | 322/28 |
| 6,617,801 B2 | * | 9/2003 | Ishizuka et al. | 315/169.3 |
| 6,628,252 B2 | * | 9/2003 | Hoshino et al. | 345/82 |
| 6,724,376 B2 | * | 4/2004 | Sakura et al. | 345/204 |
| 6,801,028 B2 | * | 10/2004 | Kernahan et al. | 322/283 |
| 6,844,760 B2 | * | 1/2005 | Koharagi et al. | 327/110 |
| 6,864,644 B2 | * | 3/2005 | Kernahan | 315/307 |
| 6,885,568 B2 | * | 4/2005 | Kernahan et al. | 363/97 |

* cited by examiner

*Primary Examiner*—Nicholas Ponomarenko
*Assistant Examiner*—Pedro J. Cuevas
(74) *Attorney, Agent, or Firm*—Oliff & Berridge, PLC

(57) ABSTRACT

In a vehicle generator control which detects an abnormal operating condition of a generator of a vehicle, and includes a transistor which drives a charging lamp to emit a warning indication when such a condition is detected, with the value of a quantity indicative of the flow of current through the charging lamp drive transistor being compared with a reference value, and with the transistor being set in a non-conducting state if the reference value is exceeded, a succession of respectively decreasing reference values is periodically generated. A timing of an initial flow of current through the charging lamp is controlled to be synchronized with the start of such a succession, so that the peak value of an initial surge current which flows through the charging lamp drive transistor is compared with the highest reference value. Complete protection can thereby be established for the charging lamp drive transistor against a flow of short-circuit current which would exceed any of the reference values.

6 Claims, 6 Drawing Sheets

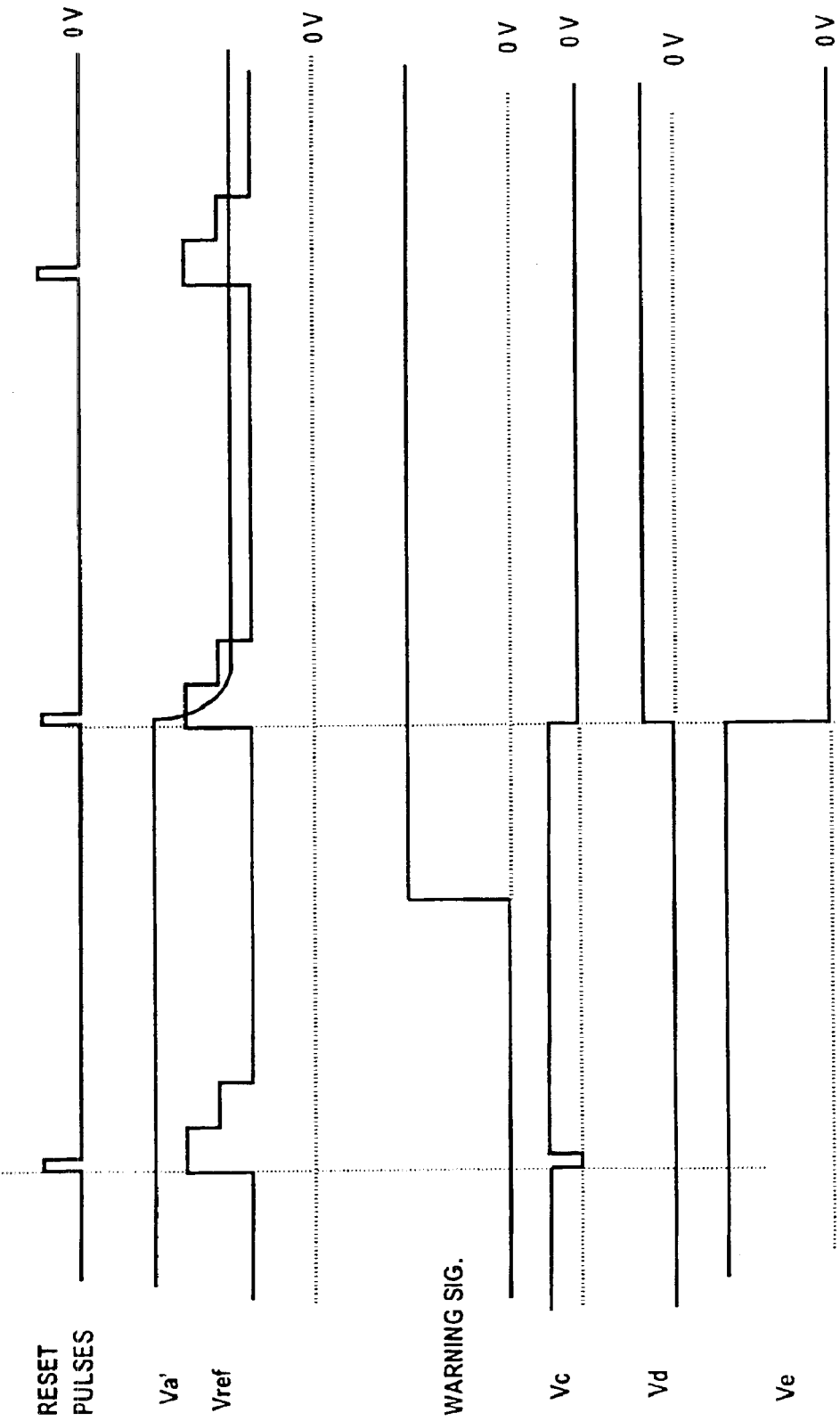

CONTROL APPARATUS FOR ELECTRICAL GENERATOR OF VEHICLE

BACKGROUND OF THE INVENTION

1. Field of Application

The present invention relates to a control apparatus for an electrical generator of a vehicle, which monitors the generating status of the generator, and controls functions such as turning on the generator warning lamp (i.e., charging lamp) of the vehicle, etc.

2. Description of Prior Art

In the prior art, types of control apparatus for an electrical generator of a vehicle are known for a vehicle which is equipped with a charging lamp that serves to notify the vehicle driver of any abnormal operation of the generator, whereby the control apparatus has a short-circuit protection function which prevents destruction of a charging lamp drive transistor when a short-circuit occurs in the charging lamp, by preventing an excessively high level of current flow. For example as described in U.S. Pat. No. 4,812,723 "Control Device for an A.C. Generator for an Automobile", a current level which is set as a threshold value for detection of the short-circuit condition of a charging lamp is made lower than a peak initial value of surge current which flows through the charging lamp when power is applied to the lamp with the lamp in a cold condition (and hence initially having a low value of resistance). When the current flow in the charging lamp exceeds that detection value, because the charging lamp is in the short-circuit condition or because the lamp is in a normal condition but an initial high surge of current through the lamp is occurring, the transistor which supplies the charging lamp with current is repetitively switched between the on and off states. This allows the effective value of current flow through the charging lamp to be limited such as to prevent damage to the transistor which drives the charging lamp, i.e., with only brief repetitive large values of current flowing through that transistor, so that overheating of the transistor does not occur. In that condition, if the charging lamp is not in the short-circuit state, it will become gradually heated. As a result, its resistance will increase, and the current flow through the lamp will decrease accordingly. When that value of current falls below the detection value, the repetitive on/off switching operation is halted, and current is allowed to pass continuously through the lamp, i.e., the normal steady-state level of current.

However while the repetitive on/off switching operation is being performed, the charging lamp may appear to the driver to be emitting light only very dimly, or not at all. If the charging lamp is in the short-circuit condition, then the repetitive on/off switching operation will continue until the lamp is replaced.

Another example of such a control apparatus for an electrical generator of a vehicle is described in Japanese patent 60-66631 "Charging Display Apparatus for Electrical Generator of Vehicle", and Japanese patent 6-189467 "Voltage Control Apparatus for AC Generator of Vehicle".

Normally, when the driver of a vehicle turns on the ignition switch, before actually starting the vehicle engine, the charging lamp will light, to indicate that the generator is not yet in operation, i.e., no charging current is being supplied to the battery. With such prior art types of control apparatus, particularly if the vehicle is being operated in a cold environment, some time may elapse after the ignition switch is turned on and the aforementioned repetitive on/off switching supply of current to the charging lamp begins, until the charging lamp becomes sufficiently warm that the control apparatus begins to drive the lamp with a continuous flow of current. Thus there will be a period of delay after the ignition switch is turned on, before the charging lamp begins to emit the normal level of light. This can cause uneasiness to the driver, who may for example mistakenly believe that there is a problem with the electrical system of the vehicle.

If it is attempted to overcome this by increasing the threshold value that is used to detect the short-circuit current level, then another problem arises. Specifically, a short-circuit condition of the charging lamp may not be a perfect short-circuit, but may result in a level of resistance which is intermediate between the normal value and the short-circuit value, and if the above measure of increasing the detection threshold value is adopted, then it may become impossible to detect such a partial short-circuit condition. Furthermore, large values of current flow may occur through the charging lamp drive transistor, which may result in overheating and destruction of that transistor, or overheating and melting of the connecting leads which supply current to the charging lamp.

It can thus be understood that in the prior art, it has not been possible to provide a control apparatus for an electrical generator of a vehicle whereby certain basic conditions can both be satisfied, i.e.:

(a) the capability for distinguishing between a high level of current flow through a display device drive transistor that results from a temporary surge of current through a display device which is functioning normally, and a high level of current flow that results from a short-circuit condition, (b) the capability for reliably detecting both a complete short-circuit and a partial short-circuit condition of the charging lamp (i.e., whereby there would be a level of current flow through the charging lamp that is lower than the level which would occur in the case of a complete short-circuit, but is higher than a normal steady-state level of current flow through the charging lamp) and (c) the capability for driving the charging lamp to provide an immediate indication that the vehicle generator is not functioning, when such a condition is detected.

SUMMARY OF THE INVENTION

It is an objective of the present invention to overcome the problems of the prior art set out above, by providing a control apparatus for an electrical generator of a vehicle whereby the above-mentioned requirements are satisfied.

To achieve this objective, according to a first aspect of the invention, such a control apparatus includes switch means such as field effect transistor (FET) or bipolar transistor, which drives a display device such as a charging lamp that indicates a power generating status of the electrical generator, current detection means for detecting a value of current flow through the switch means, reference value generating means for outputting a reference value, to be compared with the detected value of current, and current limiting means for comparing the detected current value with the reference value, and for limiting the current supplying operation of the switch means in accordance with a result of the comparison. An apparatus according to the present invention is characterized in that the reference value generating means periodically outputs a succession of reference values which respectively decrease in magnitude, including a first reference value corresponding to a current value which is greater than a maximum value of surge current that may flow in the switch means when the display device is functioning normally, and a second reference value which corresponds to a current value that is greater than a steady-state value of current which flows in the switch means when the display device is functioning normally, but that is lower than the first reference value.

In particular, the reference value generating means may be configured to produce three or more reference values including the first and second reference values, to output the first reference value during a time interval within which a maximum value of an initial flow of current through the switch means occurs, and outputs a plurality of the reference values other than the first reference value as values which become successively smaller in a stepwise manner during respective successive time intervals following a time interval in which the first reference value is outputted.

Furthermore, the reference value generating means may be configured to establish successively shorter respective durations of the time intervals for outputting the reference values, in accordance with respective magnitudes of the reference values.

Moreover the reference value generating means is preferably configured to repetitively output such a succession of plural reference values, with a fixed repetition period which is preferably at least 10 ms.

BRIEF DESCRIPTION OF THE DRAWINGS

FIG. 8 is a timing diagram of the operation of the second embodiment for the case of the charging lamp being in a normal operating condition.

DESCRIPTION OF PREFERRED EMBODIMENTS

Figure 1:
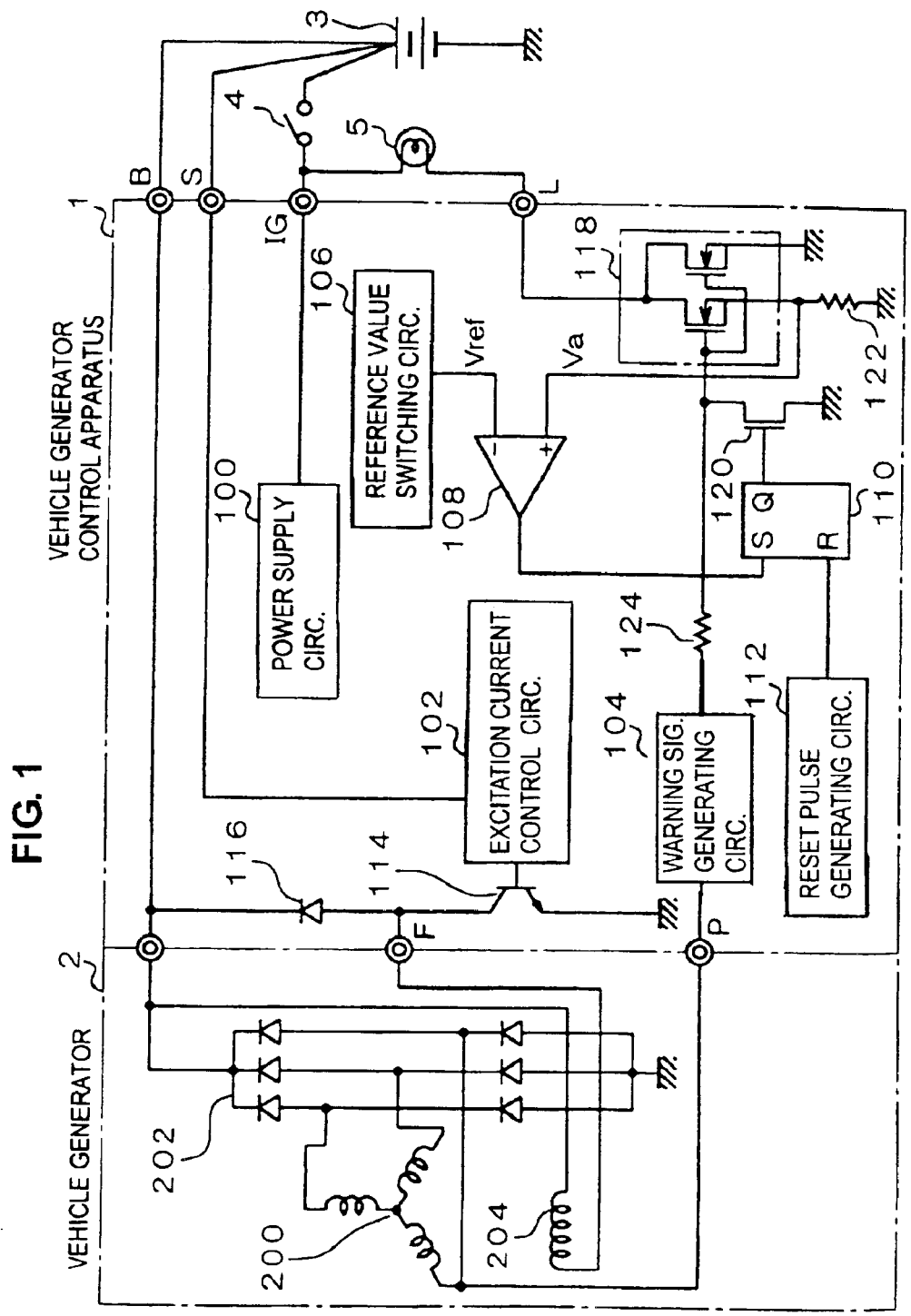
FIG. 1 shows the overall configuration of a first embodiment of a vehicle generator control apparatus according to the present invention.
Figure 4:
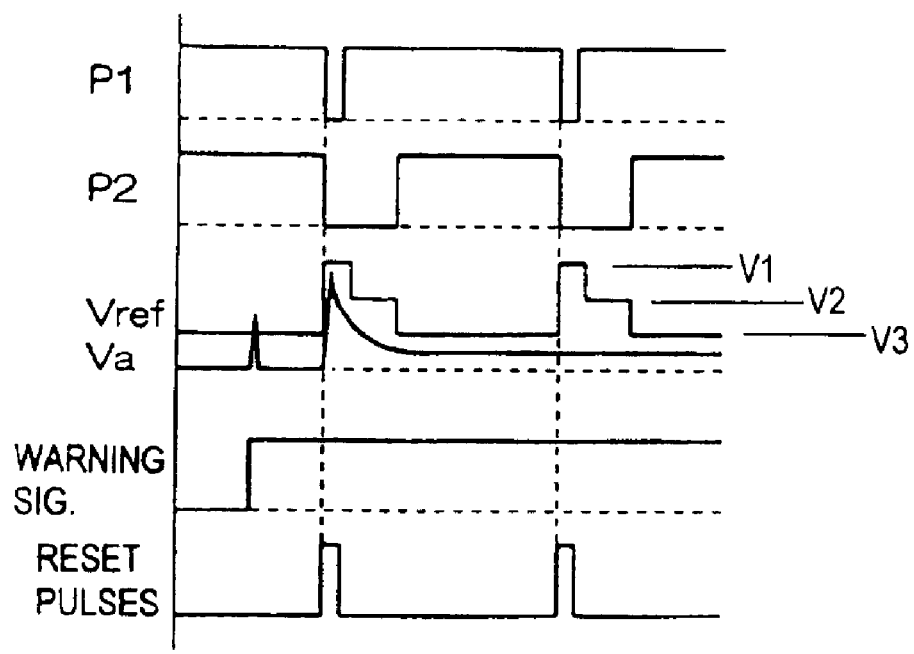
FIG. 4 is a timing diagram of the operation of the first embodiment for the case of the charging lamp being in a normal operating condition.
Figure 5:
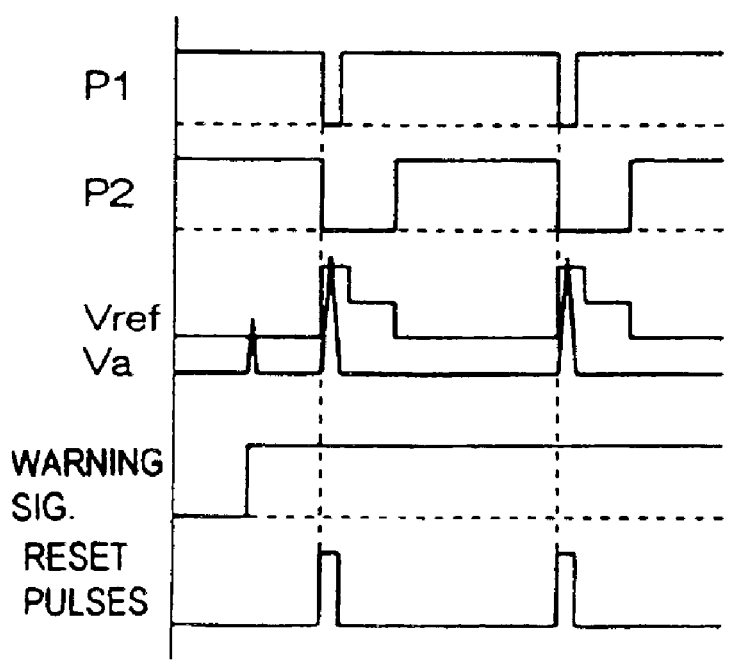
FIG. 5 is a timing diagram of the operation of the first embodiment for the case of the charging lamp being in a short-circuit condition.

FIG. 1 is a system block diagram of a first embodiment. The diagram also illustrates the connection relationships between the vehicle generator control apparatus, designated by numeral 1, and the vehicle generator 2, the battery 3 of the vehicle, and the charging lamp 5. The vehicle generator control apparatus 1 controls the excitation current of the windings in the vehicle generator 2 such as to maintain the voltage of the battery 3 at a predetermined value, such as 14 V. In addition, the vehicle generator control apparatus 1 controls the on/off status of the charging lamp 5 in accordance with whether or not the vehicle generator 2 is functioning normally. FIGS. 4 and 5 are timing diagrams for illustrating the operation of the control apparatus, for the case of normal operation and the case of abnormal operation (i.e., a short-circuit condition of the charging lamp 5) respectively.

The vehicle generator 2 is made up of a stator windings 200, a rectifier circuit 202 which converts the 3-phase AC output from the stator windings 200 to a full-wave rectified voltage, and an excitation winding 204 which is mounted on a rotor. Control of the output voltage from the vehicle generator 2 is performed by the vehicle generator control apparatus 1, by performing repetitive on/off control of current flow through the excitation winding 204. An output terminal B of the vehicle generator control apparatus 1 is connected to the battery 3, for supplying a charging current to the battery 3.

The configuration and operation of the vehicle generator control apparatus 1 are as follows. As shown in FIG. 1, the vehicle generator control apparatus 1 is made up of a power supply circuit 100, excitation current control circuit 102, a warning signal generating circuit 104, a reference value switching circuit 106, a comparator 108, a set/reset type flip-flop (SR-FF) 110, a reset pulse generating circuit 112, a bipolar transistor 114, a diode 116, transistors 118, 120, and resistors 221 and 224.

When the ignition switch 4 which is connected between the ignition terminal IG and the battery 3 is set in the closed position, the power supply circuit 100 supplies power to operate each of the circuits within the vehicle generator control apparatus 1 (with the respective power supply connecting leads being omitted from the drawing). In that condition, the excitation current control circuit 102 repetitively turns the transistor 114 on and off in accordance with the level of the battery voltage that appears at the terminal S, to thereby control the level of excitation current which flows in the excitation winding 204.

The warning signal generating circuit 104 monitors the voltage (phase voltage) which appears at the terminal P, that is connected to one of the phase windings of the stator windings 200, and outputs a warning signal at a high level (i.e., a positive DC potential) when the monitored phase voltage becomes lower than a predetermined value. That warning signal is produced from an output terminal of the warning signal generating circuit 104 that is connected to one end of a resistor 124, whose other end is connected to the gate terminal of a transistor 118. It is assumed here that the transistor 118 is a SENSE FET, however use of other types of FET is equally possible. When the warning signal is applied via the resistor 124 to the gate of the transistor 118, that transistor is turned on, so that a path is created between the terminal L of the vehicle generator control apparatus 1, through the drain electrode and a primary source terminal of the transistor 118 to ground potential. Hence, current flows through the charging lamp 5 from the battery 3 into the terminal L, and so the charging lamp 5 is turned on.

A resistor 122 is connected between a secondary (i.e., sense) source terminal of the transistor 118 and ground potential, with the junction between the resistor 122 and the transistor 118 being connected to the positive-side (i.e., non-inverting) input terminal of the comparator 108. The resistor 122 has the function of detecting the value of current which is flowing through the charging lamp 5, i.e., the level of the detection voltage Va which is developed at the junction of resistor 122 with the input terminal of the comparator 108 indicates the value of current flow through the charging lamp 5.

The reference value switching circuit 106 generates a reference voltage Vref at three different levels, corresponding to three different reference current values, with Vref being produced successively from the highest to the lowest level, and with that succession of levels occurring periodically with a fixed period, as illustrated in FIGS. 4 and 5. These three levels will be designated as V1, V2 and V3, respectively, from the highest to the lowest. The highest level V1 is predetermined as being higher than the maximum value of detection voltage Va that will be produced by resistor 122 when the ignition switch 4 is turned on, the transistor 118 is thereby turned on, and an initial surge of a high level of current flows through the charging lamp 5 (i.e., caused by the charging lamp 5 being in an initial cool condition and hence having an initial low value of resistance). The intermediate level V2 is predetermined as being higher than the maximum value of the detection voltage Va after a specific time interval has elapsed after initiation of current flow through the charging lamp 5, so that the temperature (and hence, resistance) of the charging lamp 5 has increased to a certain degree. The lowest level V3 is predetermined as being higher than the maximum value that could be expected to be attained by the detection voltage Va when the normal (rated) level of current is flowing in the charging lamp 5.

In addition, as illustrated in FIGS. 4, 5, the respective durations of the time intervals in which Vref takes the values V1, V2, V3 successively are made increasingly longer. From considerations of ensuring that excessive increase in temperature of the drive transistor 118 does not occur, the repetition period of the reference voltage Vref (i.e., period between each transition to the V1 level) is preferably made greater than 10 ms.

The comparator 108 receives the reference voltage Vref at its negative-side (i.e., inverting) input terminal, and compares the value of Vref with that of the detection voltage Va from the resistor 122, representing the value of current flowing in the charging lamp 5. If Va is higher than Vref, then a high level output signal is produced from the comparator 108, while conversely if Va is lower than Vref then a low-level output signal is produced from the comparator 108. The output terminal of the comparator 108 is connected to the S (set) input terminal of the SR-FF 110, while the output terminal of the reset pulse generating circuit 112 is connected to the R (reset) input terminal of the SR-FF 110. The Q output terminal of the SR-FF 110 is connected to the gate of the transistor 120. When a high-level signal is applied to the S input terminal of the SR-FF 110, the Q output terminal goes to the high level, so that the transistor 120 is turned on. The gate of the transistor 118 is thereby held at the low level (i.e., ground potential), so that the transistor 118 is held in the off state. Conversely, when a reset pulse is applied to the R input terminal of the SR-FF 110 from the reset pulse generating circuit 112, then the Q output terminal goes to the low level, so that transistor 120 is turned off. If at that time the (high level) warning signal is being supplied from the warning signal generating circuit 104 via the resistor 124, then transistor 118 will be thereby turned on. Thus, the transistor 118 is turned on or off in accordance with the state of the warning signal.

Figure 2:
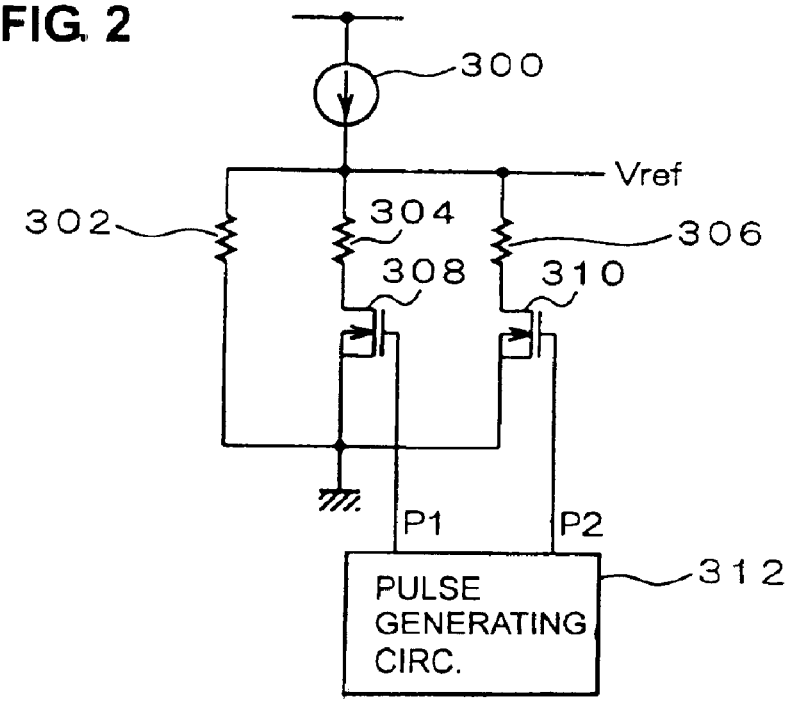
FIG. 2 shows an example of a circuit configuration of a reference value switching circuit in the first embodiment.

FIG. 2 shows an example of a specific circuit configuration for the excitation current control circuit 102. Here, the reference value switching circuit 106 is made up of a current source 300, resistors 302, 304, transistors 308, 310, and a pulse generator circuit 312. The resistor 304 and transistor 308 are connected in series, and the output current from the current source 300 branches into a first path formed by the resistor 302, a second path formed by the transistor 308 and resistor 304, and a third path formed of the resistor 306 and transistor 310. The pulse generator circuit 312 outputs two pulse trains designated as P1, P2 respectively, which as shown in FIGS. 4 and 5 each have the same period and the same high-to-low transition timings. As shown in the drawings, immediately after each high-to-low transition of the pulse train P1, a low-to-high transition occurs, whereas each low-to-high transition of the pulse train P2 occurs after a specific amount of delay with respect to the corresponding low-to-high transition of the pulse train P1.

When both of the pulse trains P1, P2 are at the low level, the transistors 308, 310 are both in the off state, so that the current which is outputted from the current source 300 flows through the first path, i.e., the resistor 302. A large voltage drop occurs across the resistor 302, so that the voltage Vref which appears at the junction between the resistor 302 and the current source 300 attains the highest value, V1.

When the pulse train P2 goes to the high level, with the pulse train P1 at the low level, only the transistor 310 is set on, while transistor 308 is held in the off state, so that the current that is outputted from the current source 300 branches to flow through the first current path formed by the resistor 302 and the third current path formed by the resistor 306 and transistor 310. Hence, the voltage drop across the resistor 302 becomes smaller, and so the reference voltage Vref attains the value V2, lower than V1. When both of the pulse trains P1, P2 are at the high level, so that both of the transistors 308 and 310 are in the on state, that the current that is outputted from the current source 300 branches to flow through the first current path formed by the resistor 302, the second current path formed by the resistor 304 and transistor 308, and the third current path formed by the resistor 306 and transistor 310. Hence, the voltage drop across the resistor 302 becomes further reduced, and so the reference voltage Vref attains the lowest value V3.

Hence with the circuit of FIG. 2, the reference value switching circuit 106 periodically generates the reference voltage Vref at the three successive levels V1, V2, V3, i.e., in descending order of magnitude, with the respective time intervals in which Vref attains the levels V1, V2, V3 being of successively increasing duration, as illustrated in FIGS. 4 and 5.

Although not shown in the drawings, the control apparatus is configured such that the operation of the reference value switching circuit 106 in generating the pulse trains P1, P2 is synchronized with the operation of the reset pulse generating circuit 112.

Figure 3:
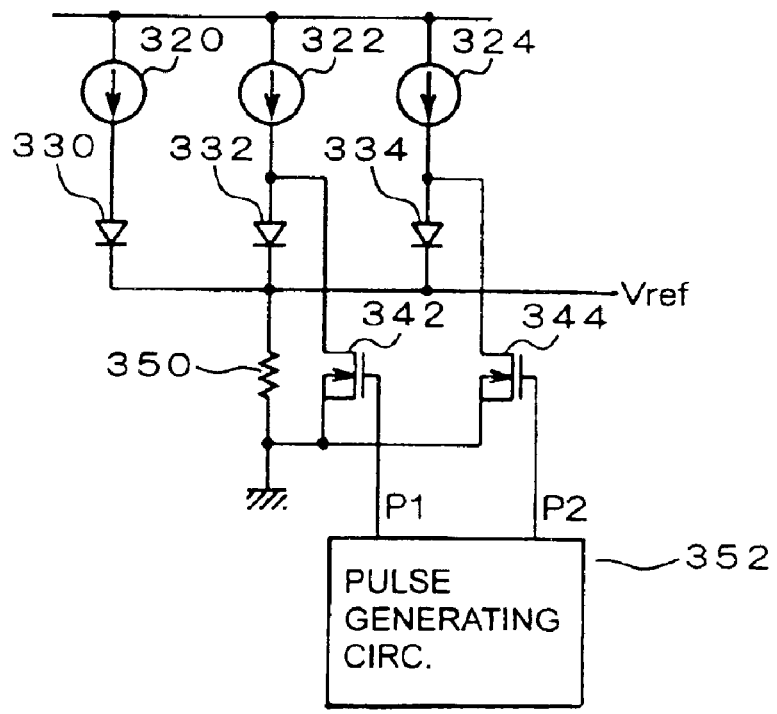
FIG. 3 shows an alternative circuit configuration of the reference value switching circuit in the first embodiment.

FIG. 3 shows an alternative circuit configuration for the reference value switching circuit 106. In this case the circuit contains three current sources 320, 322 and 324, diodes 330, 332 and 334, transistors 342, 344, resistor 350, and a pulse generator circuit 352 which functions in the same manner as the pulse generator circuit 312 of FIG. 2 to generate the pair of pulse trains P1, P2. The outputs of the three current sources 320, 322 and 324 are respectively connected via the diodes 330, 332 and 334 to the resistor 350. The junction between the current source 322 and diode 332 is connected to ground potential via the transistor 342 when that transistor is set on, and similarly the junction between the current source 324 and diode 334 is connected to ground potential via the transistor 344 when that transistor is set on.

When the pulse trains P1, P2 are both at the low level, then both of the transistors 342, 344 are in the off state, so that the fixed currents which are outputted from the current sources 320, 322, 324 flow through the diodes 330, 324, 334 to the resistor 350. Hence, a high level of current flows through the resistor 350, and a correspondingly high value of voltage drop occurs across the resistor 350, so that the reference voltage Vref which is developed at the junction between the resistor 350 and each of the diodes 330, 324, 334 attains the highest value V1. When the pulse trains P1, P2 are at the low level and low level respectively, then transistor 344 is set in the on state, so that the current from the current source 324 now flows through the transistor 344 thereby reducing the current flow through the resistor 350, and the reference voltage Vref developed across the resistor 350 is correspondingly reduced, going to the value V2. When the pulse trains P1, P2 are both at the high level, then both of the transistors 342, 344 are in the on state, so that the fixed currents which are outputted from the current sources 322, 324 flow through the transistors 342, 344, thereby further reducing the current flow through the resistor 350, so that the reference voltage Vref attains the lowest value V3.

It can thus be understood that the embodiment of FIG. 1 contains a display control section for controlling the charging lamp 5, which basically consists of a switch section formed of the transistor 118, a current value detection section formed of the resistor 122, a reference value outputting section formed of the reference value switching circuit 106, and a current limiting section constituted by the combination of the SR-FF 110, the transistor 120 and the comparator 108.

The operation of the control apparatus shown in FIG. 1 is as follows:

1. Operation During Normal Operation of Charging Lamp

FIG. 4 is a timing diagram for describing the operation when the charging lamp 5 is in a normal condition. FIG. 4 shows successively, from top to bottom, the two pulse trains P1, P2, the reference voltage Vref produced from the reference value switching circuit 106 and the current value detection voltage Va which appears at the junction of the resistor 122 and the transistor 118 (with the Vref and Va waveforms shown mutually superimposed, for ease of understanding), the warning signal that is produced from the warning signal generating circuit 104, and the train of reset pulses which are produced from the reset pulse generating circuit 112.

When the ignition switch 4 is closed, if the vehicle generator 2 is not functioning normally to generate a charging current, then the phase voltage which appears at the terminal P will be lower than a predetermined value, so that the warning signal is outputted at the high level from the warning signal generating circuit 104, and the transistor 118 is thereby set in the on state. When this occurs, then assuming that the charging lamp 5 is in a cold condition, a high level of surge current will flow through the charging lamp 5, and the current value detection voltage Va produced across the resistor 122 will begin to rise. In the example of FIG. 4, it is assumed that this occurs while the reference voltage Vref is at the lowest of the aforementioned three levels, i.e. V3. When the level of the detection voltage Va exceeds that level V3, the output from the comparator 108 thereby changes from the L to the H level, so that the voltage at the Q output terminal of the SR-FF 110 changes from the low to high level. The transistor 120 is thereby turned on, so that the junction of the resistor 124 and the gate of the transistor 118 becomes clamped at ground potential. The transistor 118 is thereby changed to the off condition, so that current flow through the charging lamp 5 is halted, and the detection voltage Va immediately returns to the L level.

Thus in this case, only a momentary spike of current flow through the charging lamp 5 and the transistor 118 can occur.

When the next reset pulse is applied to the R input terminal of the SR-FF 110, the Q output terminal goes to the low level, so that the transistor 120 is turned off, and the high level of the warning signal is now applied via the resistor 124 to the gate of the transistor 118. The transistor 118 is thereby turned on, and since the charging lamp 5 is still in the cold condition, a large surge of current occurs through the charging lamp 5 and transistor 118, and the detection voltage Va goes to a correspondingly high level. The value of the highest level V1 of the reference voltage Vref is predetermined such as to exceed the maximum value which Va can attain at this time, if the charging lamp 5 is not in a short-circuit condition. Thus the output voltage from the comparator 108 remains at the high level, and the transistor 118 is held in the on condition, so that the charging lamp 5 continuously emits light.

As soon as current begins to flow through the charging lamp 5, it begins to heat up, thereby increasing in resistance. The level of current flow through the charging lamp 5 and transistor 118 thereby begins to fall, and the detection voltage Va accordingly begins to fall, as illustrated in FIG. 4. The respective durations of the time intervals for which the reference voltage Vref remains at the highest level V1 and the intermediate level V2 are predetermined such that, as the detection voltage Va falls after an initial surge of current through the charging lamp 5, the level of Vref always exceeds that of Va (if the charging lamp 5 is not in a partial or complete short-circuit condition). Hence, the transistor 120 is held in the off state by the Q output from the SR-FF 110, so that the high level of the warning signal continues to be applied to the gate of the transistor 118.

2. Operation During Short-Circuit Condition of Charging Lamp

The operation in the case of a complete short-circuit condition will first be described referring to FIG. 5, i.e., where the resistance between the terms IG and L is substantially zero (due to a short-circuit within in the charging lamp 5, or due to an accidental short-circuit connection being established between the terminals). In this case, when the warning signal rises to the high level, the same initial sequence of events occurs as described for FIG. 4, whereby the increase in the detection voltage Va exceeds the low level (V3) of the reference voltage Vref and so causes the output voltage from the comparator 108 to set the SR-FF 110, thereby causing the transistor 120 to enter the on condition, and so clamping the gate potential of the transistor 118 at the low level (i.e., ground potential), so that current flow through the charging lamp 5 and reset pulse generating circuit 112 is immediately terminated. When the next reset pulse occurs, thereby resetting the SR-FF 110 and so turning off the transistor 120 and enabling the warning signal to drive the transistor 118, a high level of current flow through the charging lamp 5 and transistor 118 again occurs. However in this case, when the reference voltage Vref goes to the highest level V1, that level is exceeded by the detection voltage Va.

That is to say, in this case, the level of short-circuit current through the transistor 118 exceeds the maximum (surge) level of current which can flow when the charging lamp 5 is functioning normally.

The output voltage of the comparator 108 thereby goes to the high level, so that the SR-FF 110 is set, with the Q output terminal going to the high level and so setting the transistor 120 in the on condition. Since the junction of the resistor 124 and the gate of the transistor 118 is now clamped at ground potential, current flow through the transistor 118 is terminated. When the next reset pulse occurs, the same series of operations again occurs, so that the transistor 118 is held continuously in the off state, and so is reliably protected against the short-circuit condition.

As described above, it is possible that an incomplete short-circuit condition may occur, i.e., whereby there is a low-resistance path between the IG terminal and the L terminal of the voltage control apparatus 1. In such a case, the detection voltage Va may attain a value which is between the highest level V1 and intermediate level V2 of the reference voltage Vref. When that is the case, when the first reset pulse occurs after the warning signal has gone to the high level, the output from the comparator 108 will remain at the low level while Vref is at the highest level V1, so that the Q output from the SR-FF 110 will be at the low level, and the transistor 118 thereby will be held in the on state by the high level of the warning signal. Thus, a high level of current will flow through the transistor 118 during the first time interval at which Vref is at its highest level, after the warning signal goes to the high level. However, when Vref falls to the intermediate level V2, the output from the comparator 108 will go to the high level, so that the SR-FF 110 is set, and the Q output voltage causes the transistor 120 to clamp the gate of the transistor 118 at ground potential. Current flow through the transistor 118 is thereby terminated, so that short-circuit protection is achieved.

Thereafter, current will flow through the transistor 118 only during each of the short intervals in which the reference voltage Vref is at the highest level V1. Hence, damage to the transistor 118 can be avoided, by making the duration of each interval of the lowest level V3 sufficiently long in relation to each of the intervals at the highest level V1.

Similarly, a partial short-circuit condition between the terminals IG and L of the vehicle generator control apparatus 1 may occur whereby the current which flows through the transistor 118 is between the intermediate level V2 and lowest level V3 of the reference voltage Vref. In that case, as can be understood from the above description, current will flow through the transistor 118 only during each of the pair of successive intervals in which Vref attains the highest level V1 and intermediate level V2. Thus in this case too, effective short-circuit protection for the transistor 118 can be achieved by this embodiment.

It can thus be understood that with this embodiment, the objectives set out for the invention are satisfied, since reliable detection is achieved of a complete or partial short-circuit condition, whereby a low-resistance path has arisen between the output voltage of the vehicle battery and the transistor 118 which drives the charging lamp 5. This is achieved by means of accurate discrimination between a flow of current that is caused by such a short-circuit condition and a high initial surge of current through the charging lamp 5 which may occur due to the charging lamp 5 being in a cold condition. This accurate discrimination is made possible by the manner in which the level of the reference voltage Vref is made to vary, i.e., in a stepwise manner which approximates to the variation of the level of current through the charging lamp 5 and transistor 118, as the charging lamp 5 becomes heated and the current flow accordingly decreases.

It can further be understood that this accurate capability for accurate discrimination enables the embodiment to distinguish between a condition of normal operation of the charging lamp 5, a condition of a complete short-circuit path from the output voltage of the battery 3 to the terminal L (whereby the highest level V1 of the reference voltage Vref is exceeded by the detection voltage Va as described above), a condition of a partial-resistance short-circuit path being established (whereby only the intermediate level V2 of the reference voltage Vref is exceeded by the detection voltage Va), and a condition of a partial-resistance short-circuit path having higher resistance (whereby only the lowest level V1 of the reference voltage Vref is exceeded by the detection voltage Va).

It is thus ensured that any condition of short-circuit which would result in level of current through the charging lamp drive transistor that is above the normal (steady-state) level will be reliably detected, and short-circuit protection applied. Furthermore if the vehicle generator control apparatus 1 is functioning normally, with no short-circuit path to the transistor 118, then the charging lamp 5 will immediately be turned on when the warning signal generating circuit 104 detects that the operation of the vehicle generator 2 is abnormal.

Although the above embodiment has been described for the case of periodically establishing three different levels for the reference voltage Vref, it would be equally possible to use a greater number of levels. Alternatively, it would be possible to simplify the apparatus by establishing only two different levels for Vref.

As mentioned hereinabove, the repetition period of the stepwise changes in the reference voltage Vref is preferably made 10 ms or greater. This ensures that when a short-circuit condition exists, so that short-duration high-level current pulses flow through the transistor 118 each time that Vref is exceeded by the detection voltage Va as described above, sufficient time will elapse between these current pulses to allow cooling of the transistor 118, so that damage to the transistor 118 can be avoided.

The lowest level V3 of the reference voltage Vref is preferably made only slightly higher than the maximum level that can be expected to be attained by the charging lamp 5 when the normal (i.e., steady-state) value of current is flowing through the charging lamp 5. In that way, it is ensured that, other than for periodic short-duration pulses as described above, an excessive level of current cannot flow through the transistor 118 under any circumstances.

Figure 6:
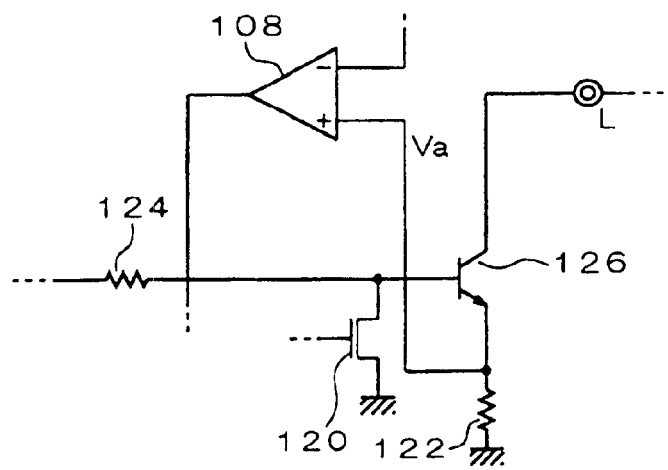
FIG. 6 is a partial circuit diagram of an alternative configuration of the first embodiment, whereby a bipolar transistor constitutes a charging lamp drive transistor.

Furthermore, although the above embodiment has been described for the case of a sense FET being used as the transistor 118 which drives the charging lamp 5, it would be equally possible to use other types of transistor, i.e., a MOS FET or a bipolar transistor. FIG. 6 is a partial circuit diagram illustrating the use of a bipolar transistor 126 to drive the charging lamp 5. Use of a MOS FET rather than a bipolar transistor, however, has the advantage that the drain-source resistance of a MOS FET, in the on state, is lower than the collector-emitter resistance of a bipolar transistor in the saturation state, so that less heat is produced by a MOS FET when used in such a current drive application.

Second Embodiment

With the first embodiment described above, the control apparatus detects any occurrence of a condition whereby a complete or partial short-circuit condition exists between the transistor 118 and the output voltage of the battery 3, by detecting when a flow of current through the transistor 118 (other than any initial current surge that is caused by commencing to drive the charging lamp 5 when it is at a low temperature) exceeds the normal steady-state level of current which should flow through the transistor 118 when the warning signal is at the high level. With the first embodiment, such an excessive level of current flow through the transistor 118 is detected by monitoring the voltage which is developed across the resistor 122. A second embodiment will be described, operating on similar principles to those of the first embodiment, but differing as follows. With the second embodiment, rather than monitoring the current flow through the transistor which drives the charging lamp 5 by utilizing the voltage developed across the resistor 122 as a detection voltage, the voltage which appears at the junction between the charging lamp 5 and the transistor which drives the charging lamp 5 (i.e., which appears the L terminal) is monitored, as an indication of the magnitude of current flow through the charging lamp drive transistor.

Figure 7:
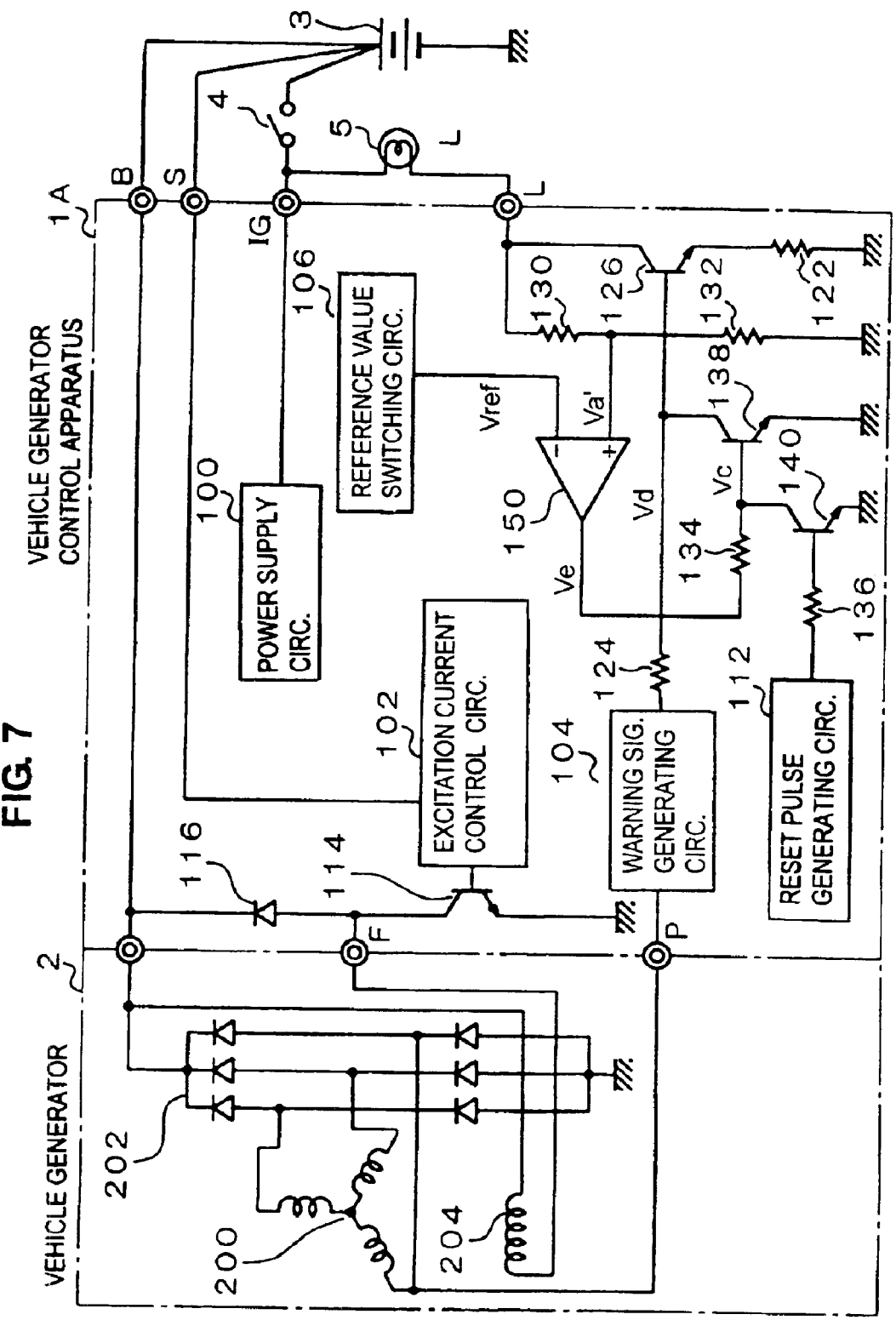
FIG. 7 shows the overall configuration of a second embodiment of a vehicle generator control apparatus.

The embodiment will be described for the case of the charging lamp drive transistor being a bipolar transistor, however it would be equally possible to utilize a sense FET as for the first embodiment, or a MOS FET. FIG. 7 is a system block diagram of this embodiment, in which components corresponding to components in the embodiment of FIG. 1 are indicated by corresponding designation numerals, and the vehicle generator control apparatus is designated as 1A. Detailed description will be given only of the features of difference between the first and second embodiments. In FIG. 7, the warning signal from the warning signal generating circuit 104 is supplied via the resistor 124 to the base of a NPN bipolar transistor 126, whose emitter is connected via the resistor 122 to ground potential. A NPN transistor 138 is connected between the junction of the resistor 124 with the base of the transistor 126 and ground potential. The output voltage from the comparator 150 is applied via a resistor 134 to the base of the transistor 138, and a NPN transistor 140 is connected between the junction of the resistor 134 with the base of the transistor 138 and ground potential. The reset pulses produced from the reset pulse generating circuit 112 are supplied via a resistor 136 to the base of the transistor 140.

The collector of the transistor 126 is connected via the L terminal to the charging lamp 5, and resistors 130, 132 are connected as a resistive voltage divider between the collector of transistor 126 and ground potential. The voltage Va' which appears at the junction of the resistors 130, 132 constitutes the detection voltage of this embodiment, which is supplied to the non-inverting input terminal of the comparator 150 to be compared with the reference voltage Vref that is produced from the reference value switching circuit 106.

The operation of this embodiment will be described first for the case in which the charging lamp 5 is in a normal condition, with no short-circuit current path existing between the L terminal and the supply voltage of the battery 3. The operation will be described referring to the timing diagram of FIG. 8, in which the voltage appearing at the junction of the resistor 134 with the base of the transistor 138 is designated as Vc, the voltage appearing at the junction of the resistor 124 with the base of the transistor 126 is designated as Vd, and the output voltage from the comparator 150 is designated as Ve. The manner of variation of the reference voltage Vref of this embodiment is basically identical to that of the first embodiment, with the three highest to lowest levels V1 to V3 being successively attained periodically with a fixed period.

Firstly, while the warning signal is at the low level, the transistor 126 is held in the off state, so that the output voltage of the battery 3 is applied through the charging lamp 5 to the L terminal, and the detection voltage Va' is thereby at a high level. The output Ve from the comparator 150 is thereby at the low level, so that the transistor 138 is held in the on state. In addition, each time that a reset pulse is generated, the transistor 140 is momentarily set in the on state, so that the base of transistor 138 is momentarily clamped at the low level (ground potential).

When the warning signal goes to the high level (assuming that this occurs during an interval in which the reference voltage Vref is at the lowest level V3), the transistor 126 remains in the off state, since the base of that transistor is still clamped at the low level by the transistor 138. When the next reset pulse occurs, thereby setting transistor 140 in the on state, the transistor 138 is thereby set in the off state, so that a current flows through the resistor 124 into the base of transistor 126, thereby setting transistor 126 in the on state.

As current now begins to flow through the charging lamp 5, so that a voltage drop occurs across the charging lamp 5, the level of the detection voltage Va' begins to fall, and drops below the highest level V1 of the reference voltage Vref. The output Ve from the comparator 150 is thereby held at the low level, so that the transistor 138 remains in the off condition, and current continues to flow into the base of transistor 126 through the resistor 124. As the temperature of the charging lamp 5 increases due to the current flow, so that the resistance of the charging lamp 5 gradually increases, the level of the detection voltage Va' accordingly gradually falls, until a steady-state value is reached, which is below the lowest value V3 of the reference voltage Vref.

As illustrated in FIG. 8, the respective levels V1, V2, V3 of the reference voltage Vref, and the durations of the respective intervals in which the levels V1, V2 are maintained, are predetermined such as to ensure that as the level of the detection voltage Va' falls, after current begins to flow through the charging lamp 5, the value of Va' is always lower than the reference voltage Vref. It is thereby ensured that the output voltage Ve from the comparator 150 remains at the low level, so that the transistor 138 remains in the off state, and so the high level of the warning signal is enabled to maintain the transistor 126 in the on state.

If on the other hand there is a complete or partial short-circuit condition of the charging lamp 5, such that the value of the detection voltage Va' is continuously higher than the maximum level V1 of the reference voltage Vref, then the output voltage Ve from the comparator 150 will be held continuously at the high level, so that transistor 138 will hold the transistor 126 continuously in the off state, to provide short-circuit protection. If the level of short-circuit current which flows through the charging lamp 5 is such that the value of the detection voltage Va' is between the maximum and intermediate levels V1, V2 of the reference voltage Vref, then a pulse of that short-circuit current will flow through the transistor 126 only during each interval in which Vref is at the V1 level. If the level of short-circuit current which flows through the charging lamp 5 is such that the voltage Va' is between the intermediate and minimum levels V2, V3 of Vref, then a pulse of that short-circuit current will flow through the transistor 126 only during each interval in which Vref successively attains the V1 and V2 levels.

It can thus be understood that by making the repetition period of the stepwise transitions of Vref sufficiently long (so that there is sufficient time for cooling of the transistor 126 even if periodic pulses of short-circuit current occur as described above), this embodiment can provide effective short-circuit protection for the transistor 126, irrespective of the type of short-circuit that has occurred. Furthermore, similarly to the first embodiment, the operation of the second embodiment ensures that the charging lamp 5 will immediately go on when an abnormal condition of the vehicle generator 2 occurs and a warning signal is thereby produced at the high level from the warning signal generating circuit 104.

Furthermore in the same way as for the first embodiment, the lowest level V3 of the reference voltage Vref is preferably made only slightly higher than the maximum level that can be expected to be attained by the detection voltage Va' when the normal (i.e., steady-state) value of current is flowing through the charging lamp 5. In that way, it is ensured that, other than for periodic short-duration pulses as described above, an excessive level of current cannot flow through the charging lamp drive transistor 126 under any circumstances.

Figure 9:
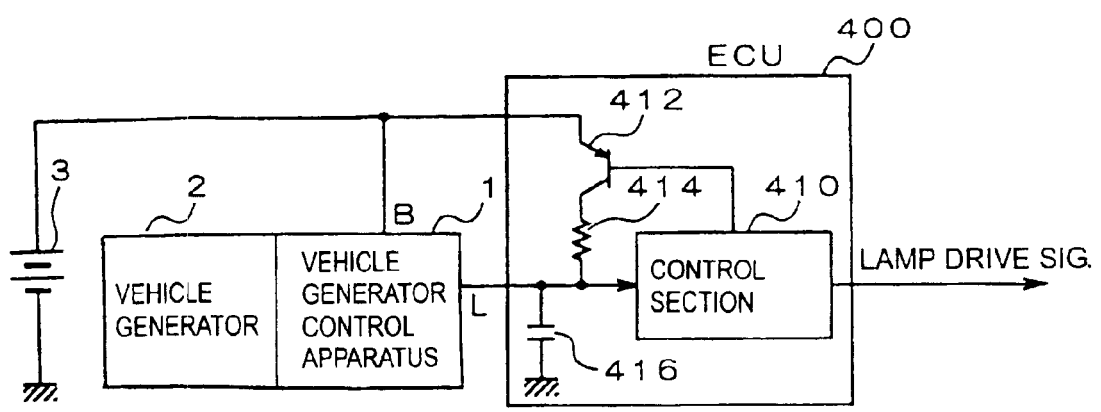
FIG. 9 shows the overall configuration of a system in which the charging lamp is driven from an ECU.

Although the invention has been described with respect to specific embodiments in the above, it should be noted that the invention is not limited to these, and that various modifications could be envisaged which fall within the scope claimed for the invention in the appended claims. For example with both of the above embodiments, the charging lamp 5 is directly driven into the on (light-emitting) condition by the transistor 118 or 126. However it would be equally possible to apply the invention to the case in which the charging lamp is driven from an external ECU (electronic control unit), etc. FIG. 9 shows an example of a system in which the charging lamp is driven from an ECU 400, which includes a control section 410 for generating a lamp drive signal, a PNP transistor 412 which is connected in series with a resistor 414 between the supply voltage of the battery 3 and the signal line which connects the L terminal of a vehicle generator control apparatus 1 to the control section 410, and a smoothing capacitor 416 which is connected between that signal line and ground potential. It is assumed that the vehicle generator control apparatus 1 is in accordance with the first embodiment described above.

With this configuration, when the charging lamp drive transistor of the vehicle generator control apparatus 1 is set in the on state, all of the charge which is stored in the capacitor 416 begins to flow through that transistor. Thus, an effect occurs which is similar to the aforementioned initial flow of surge current that occurs when a charging lamp is driven. In the same way as described for the first embodiment, the vehicle generator control apparatus 1 can distinguish between such a temporary surge of current and a short-circuit current which might be caused by an accidental connection of the battery voltage to the L terminal or to the connecting lead between the L terminal and the ECU 400. Hence in this case too, the drive transistor that is connected to the L terminal of the vehicle generator control apparatus 1 can be reliably protected against excessive current flow.

What is claimed is:

1. A control apparatus for an electrical generator of a vehicle, the apparatus comprising switch means coupled to supply a drive current to display means which indicate a power generating status of said electrical generator, said switch means operable for interrupting said supply of drive current, current detection means for detecting a level of current flow through said switch means, reference value generating means for determining a reference value, to be compared with said detected level of current, and current limiting means for comparing said level of current with said reference value, and for limiting a current supplying operation of said switch means in accordance with a result of said comparison;

wherein said reference value generating means successively outputs a plurality of reference values, including a first reference value corresponding to a current value which is greater than a maximum value of surge current which flows in said switch means, and a second reference value which corresponds to a current value that is greater than a normal value of current which flows in said switch means.

2. The control apparatus for an electrical generator according to claim 1, wherein said reference value generating means produces three or more reference values including said first and second reference values, and outputs said first reference value when a maximum value of an initial flow of current through said switch means occurs, and outputs a plurality of said reference values other than said first reference value as values which become successively smaller in a stepwise manner following outputting of said first reference value.

3. The control apparatus for an electrical generator according to claim 1, wherein said reference value generating means establishes successively shorter respective durations of outputting said reference values in accordance with respective magnitudes of said reference values.

4. The control apparatus for an electrical generator according to claim 1, wherein said reference value generating means repetitively outputs a plurality of said reference values in succession, with a fixed repetition period.

5. The control apparatus for an electrical generator according to claim 4, wherein said predetermined period is 10 milliseconds or greater.

6. The control apparatus for an electrical generator according to claim 1, wherein said switch means comprises a MOS (Metal-Oxide semiconductor) type of transistor.

* * * * *